Dec. 22, 1931. C. SACERDOTI 1,838,002

ELECTRICALLY DRIVEN ROAD VEHICLE

Filed Feb. 8, 1930 3 Sheets-Sheet 1

Inventor:
Camillo Sacerdoti
By
Attorney

Dec. 22, 1931.   C. SACERDOTI   1,838,002
ELECTRICALLY DRIVEN ROAD VEHICLE
Filed Feb. 8, 1930   3 Sheets-Sheet 2
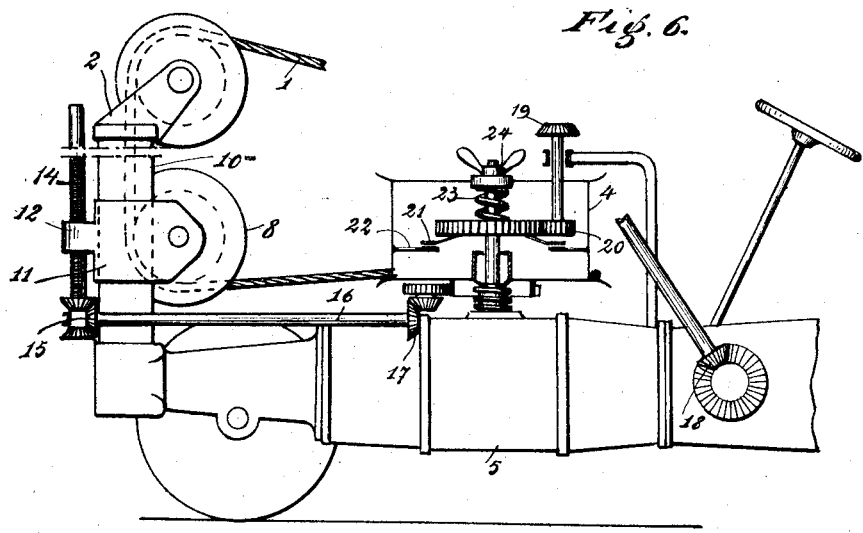
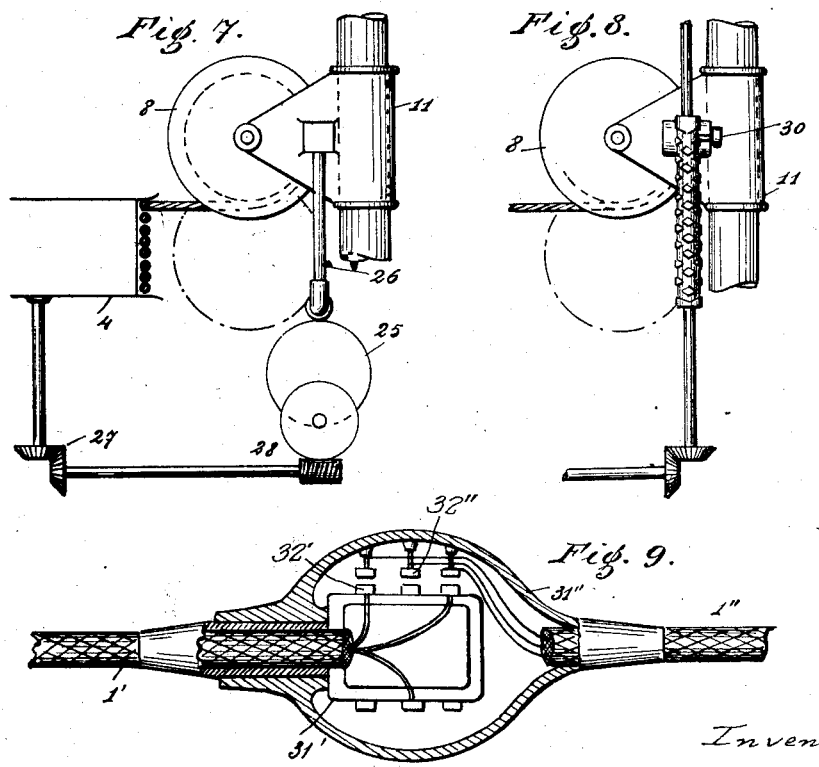

Dec. 22, 1931.    C. SACERDOTI    1,838,002
ELECTRICALLY DRIVEN ROAD VEHICLE
Filed Feb. 8, 1930    3 Sheets-Sheet 3
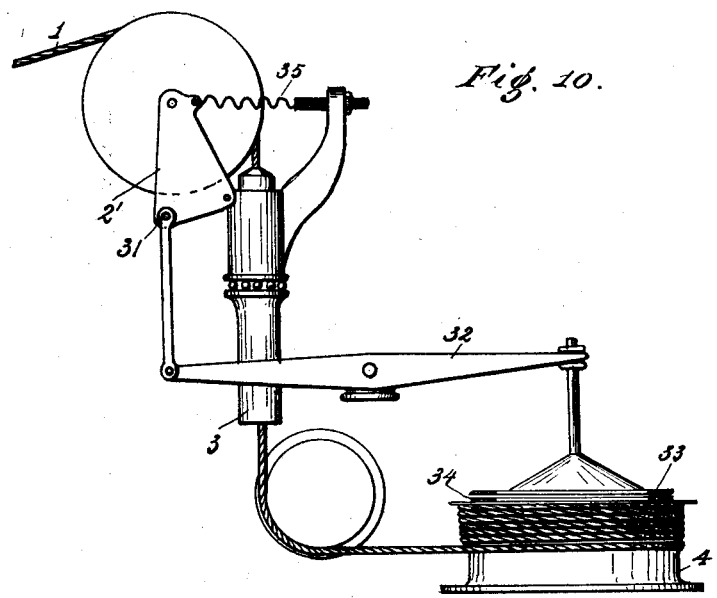
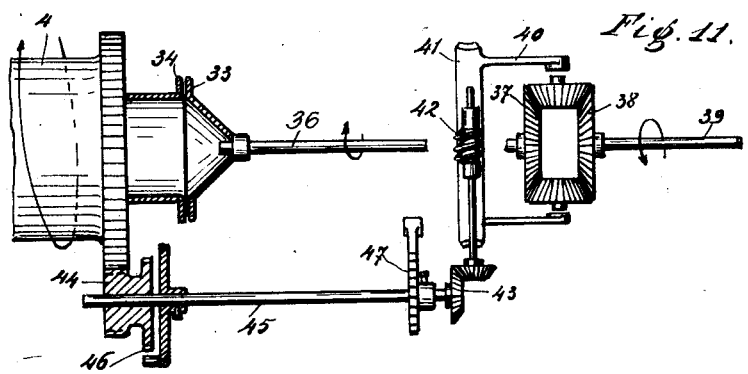
Inventor:
Camillo Sacerdoti Patented Dec. 22, 1931

1,838,002

UNITED STATES PATENT OFFICE

CAMILLO SACERDOTI, OF MILAN, ITALY

ELECTRICALLY DRIVEN ROAD VEHICLE

Application filed February 8, 1930, Serial No. 426,888, and in Italy April 29, 1929.

Electric vehicles are known which can travel on ordinary roads as well as ride over uncultivated soil or the like, that are driven by electric motors, fed through cables connected to any convenient source of electric power placed at a fixed point or at varying places according to needs and hereafter called "main terminals".

Several devices have been conceived for arranging said feeder cable so as to allow the vehicles moving away or coming near to the main terminal to manœuver as required, without fouling the sag of the cable-end coming out from the vehicle.

But all arrangements proposed heretofore have very serious disadvantages depending essentially on the weight of the cable and of its overall dimensions and also on the difficulties which are always encountered on winding or unwinding a cable on a drum of whatsoever kind, even under the best ordinary conditions.

The present invention refers to devices which tend to secure a perfect automatic operation of said winding and unwinding of the electric cable. The essential and foremost feature of the same is that the winding drum is operated by a mechanical drive of known design, by means of proper transmitting mechanisms in such a manner that the drum has always a tendency to wind up the cable at a higher speed than that with which the vehicle approaches the main terminals of the cable, but also in such a manner as to allow its unwinding under the eventual pull exerted on the cable when the vehicle moves away from said terminals.

The same invention is also characterized by other important accessory features that will be particularly described hereafter. Said features have the object of allowing the drum or winch to be mounted on the vehicle and operated by the same motor which propels the vehicle or else with an auxiliary motor.

Other features have the purpose of allowing the winch to be mounted in a fixed point or on a separate truck; others have the object of facilitating the inlet of the cable in the vehicle, to oppose the effects of its tendency to twist and to upset the vehicle: others finally have the object of improving the regularity of the winding of the cable on the drum in all circumstances and in all the various conditions of the plant.

The accompanying drawings show, diagrammatically and simply by way of example, some of the embodiments preferred, which however can be modified in their structure and in their construction.

Figs. 6-7-8 show arrangements to secure a regular winding of the cable on the drum.

Fig. 9 shows an arrangement allowing the cable to twist, without exerting any effort either on the vehicle or on the winch.

Fig. 10 shows a device for automatically reducing the friction in the friction clutch driving round the winding drum.

Fig. 11 shows a device for reducing the heating and the wear of the friction clutch driving round the winding drum.

Figure 1:
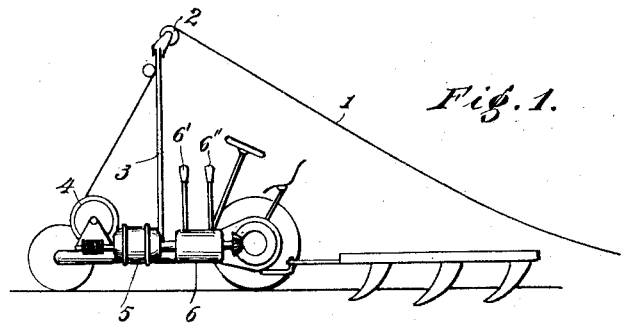
Fig. 1 shows the general plant as applied to a tractor for agricultural machines.

In the arrangement shown in Fig. 1 the vehicle, equipped as a tractor, receives the electric current through cable 1 connected to any line terminals, fixed or movable as required. Said cable rests on support 2 allowing the cable to slide along and to turn around a vertical axis so as to place itself along any vertical plane; said support 2 is carried on the standard 3 carried by the vehicle.

Figure 2:
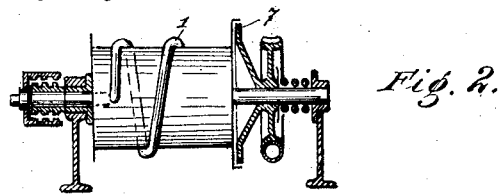
Fig. 2 shows the device for controlling the winch as applied in the case of Fig. 1.

The cable coming down said standard 3 winds on drum 4, which, in the case shown, is driven by the same motor 5 which propels the vehicle by actuating its rear wheels through a reduction gear 6 containing a friction clutch and under the control of the operating levers 6' and 6". In this case the winch is rotated by the motor, in the direction for winding the cable, by means of a friction clutch 7 (Fig. 2) in which the pressure is so adjusted that in case the cable would be drawn out with a pull exceeding a certain preestablished figure, said joint 7 will allow a backward slip and consequently the unwinding of the cable from the drum, in spite of the tendency of the motor to always drive the winch in the direction of the winding up of the cable.

Of course the same arrangement would be used on adopting an auxiliary motor for driving the winch. If the speed for winding up the cable is adjusted so as to be higher than the highest possible speed with which the vehicle may approach the point where are placed the main terminals, the cable will always be wound under a proper tension, whatever be the displacement of the vehicle and the downward sag of the incoming part of the cable will never interfere with the movements of the same vehicle, if the plant conditions are properly planned.

Figure 3:
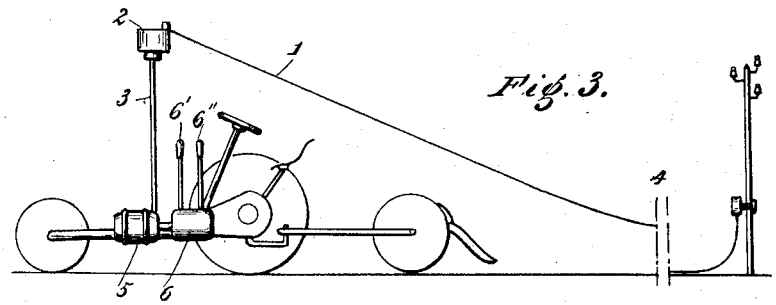
Figs. 3-4-5 show different forms of the part of the device for supporting the cable at its inlet on the vehicle.
Figure 4:
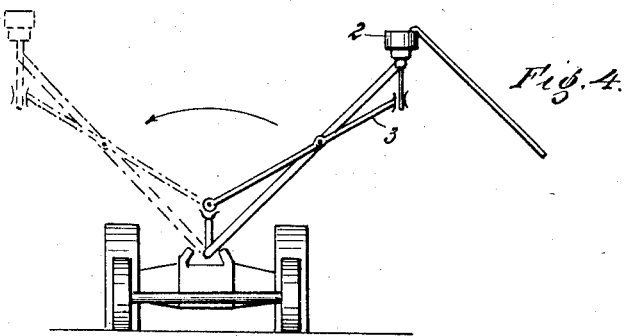

In all cases provision must be made that the cable may be allowed to slide on its supports on the vehicle, and that the electric current may arrive at the motor through said cable. Such provisions are known and are quite simple to any expert in this branch: they are not included in the present invention. The incoming cable support on the vehicle can be mounted at the top of a vertical fixed standard 3 as shown in Figs. 1 and 3 or of an inclined rod revolving about its base on the vehicle, so as to place itself along any vertical plane passing through the pivot of the base, as shown in Fig. 4.

Figure 5:
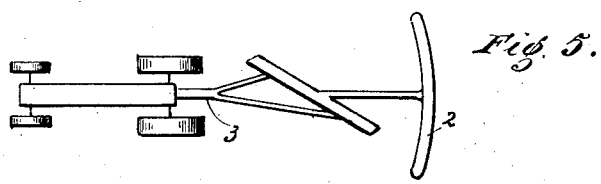

It will thus be possible to adopt an upper support offering a broad surface, for instance in the shape of a crescent as shown in Fig. 5, so as to support the descending sag of the cable, keeping it away from the vehicle, whatever position the same may assume in manœuvring in the field. The choice of the most convenient shape for said support depends of course on the type of plant to be adopted according to local circumstances, and according to whether the winch is mounted on the vehicle or separate from the same, according also to the weight and length of the cable to be supported and to the nature of the vehicle to be used. Similarly the nature of the parts of the drive for propelling the vehicle and for operating the winch as also the nature of the apparatus for controlling said drives will evidently vary according to circumstances, said nature and arrangement of said parts not forming the object of the present invention.

It must be pointed out that in the present arrangement electric motors can be used that are started at no-load and can remain under current, in continuous uniform rotation, which dispenses with the use of a controller and allows the adoption of three-phase induction motors. In the latter case the vehicle will be propelled through a variable speed reduction gear allowing for reversal of motion.

In the embodiment shown in Fig. 6 certain devices of a special and important character are used. The same have the object: of securing a greater stability of the vehicle against any upsetting action caused by the pull of the cable applied to a point always at a certain height over the ground: to give to the frame of said vehicle the necessary strength, in spite of the low position in it of all the machinery, which cannot be avoided: to eliminate as far as possible all twisting and bending efforts which the cable may bring about on the vehicle or on the drum.

In said embodiment motor 5 is placed as low down as possible correspondently to the longitudinal centre-line of the vehicle so as to carry the general centre of gravity of the structure very low down and centrally, to oppose the upsetting effort.

The housing of said motor and all the housings enclosing the transmission and controlling gears are so designed and arranged as to form a unit with the vehicle's frame structure thus contributing substantially to its strength and stiffness.

The revolving support 2 for cable 1 in the present case is mounted on a hollow standard 10, secured to the frame of the vehicle: a deviating pulley 8 guides said cable towards the winding drum 4 mounted also on the vehicle: said pulley is arranged so as to secure a good distribution of the cable on the winding drum.

In fact it is carried by a forked collar 11, girding standard 10 and capable of sliding along the same: said fork carries a threaded scroll 12, screwed on a threaded shaft 14 which shaft can revolve in both directions, without shifting longitudinally.

The control of the rotation of said threaded shaft causing the vertical shift of pulley 8 is made as follows:

At the lower end of said threaded shaft are arranged two bevel wheels, each of which is loose for one direction only of rotation: said wheels mesh with the conical wheel 15, controlled through shaft 16 and gears 17 by the winding drum. According as said drum revolves in the direction of winding or in the opposite direction, pulley 8 is lifted or lowered by means of the transmission gear described above, allowing the cable to be guided exactly towards the point on which it must rest or from which it unwinds.

The motion of the drum is produced in a manner similar to the preceding cases: the motor of the vehicle revolves, through a drive 18—19—20 of any known design, the cup 21 of a friction clutch whose other cup 22 is solid with winding drum 4. A spring 23 whose tension is adjusted by screw 24, allows the pressure between the two parts of the friction clutch to be adjusted at will; from this pressure depends the value of the pull on the cable according to which is obtained the slip in the clutch, which slip allows the cable to unwind, in spite of the motor always rotating the clutch in the direction of winding up.

Of course any other equivalent arrangement can replace the above described device for the drive, for instance a strong flat winding spring associated with proper braking contrivances, capable of slowing down, of stopping and eventually reversing, without inconvenience while remaining under current, a motor expressly designed and built for the purpose.

The shift of the pulley can be controlled by other mechanical devices. For instance an eccentric 25 (Fig. 7) can be used, operating a rod 26 solid with collar 11 carrying pulley 8: said eccentric 25 can in its turn be connected to drum 4 by means of any sort of transmission 27—28. It is also possible to adopt a rod 29 (Fig. 8) with double inverted quick-pitch interconnected screws in which engages a finger 30 solid with collar 11 carrying pulley 8, said rod 29 being set in rotation by the winding drum through a proper drive.

In order to remove the disadvantages resulting from the tendency of the cable to twist, be it due to changes in the pull, or to the vehicle's manœuvring, an arrangement as diagrammatically shown in Fig. 9 can be adopted, which figure refers to a revolving joint, securing the mechanical and electrical continuity of the cable, while allowing its different elements to rotate with regard to the neighbouring members. In said arrangement the two ends to be connected, 1' and 1" are respectively provided with coupling heads 31' and 31", capable of engaging reciprocally while allowing relative rotations of the two members around the common longitudinal axis. Electric continuity can thus be easily secured in the known manner, by means of a proper system of collecting rings 32' and of brushes 32" respectively fixed to the two parts of the joints and connected to the wires of the electric cable.

It may be feared sometimes that an excessive pull may suddenly stress the cable. In order to remove this danger, a device can be adopted adjusting automatically the pressure providing the friction in the clutch connecting the winding drum to the motor driving the same. Fig. 10 shows precisely a device for this purpose, wherein pulley 2 on which cable 1 rests on reaching the vehicle, is mounted on a piece 2' pivoting on the supporting rod 3. To said piece is hinged-in at 31 a rod controlling by means of an oscillating beam 32 or by any other proper transmission, the shift of cup 33 of the friction clutch with regard to its other cup 34. A spring 35 of sufficient and proper power acts on the oscillating piece 2', pushing cup 33 against cup 34, so as to provide the necessary pressure for obtaining the desired friction: the pull on the cable 1 has on the contrary a tendency to oscillate said piece 2' in the opposite direction, that is, so as to push cup 33 away from the other cup 34, thus decreasing the pressure causing the friction.

In this way, said friction pressure is self-adjusted by the pull on the cable and in case the pull would become too great, a rapid and almost free slip is obtained in the friction clutch driving round winding drum 4.

In the devices described, whose operation is secured by means of a friction drum, if the vehicle runs at a considerable speed with complicate manœuvring, the friction clutch may get hot and wear down rapidly. In order to remove this fault, the device shown in Fig. 11 can be adopted. According to the same, in the transmission-gear driving drum 4 is inserted a differential group, properly designed so as to allow a relative slip between the members of the clutch, viz. between the two cups 33 and 34, pressed one against the other by a spring (not shown in the drawings). Cup 33 in such a case is driven by a shaft 36 on which is mounted the pinion gear (satellite) 37 of an ordinary differential. The other pinion gear (satellite) 38 is carried around by means of the driving shaft 39 by the motor rotating the winding drum 4. On box 40, carrying the satellite gears, is mounted a helicoidal crown 41 meshing with worm gear 42 driven by the bevels 43 and by the pair of spur gears 44, driven by drum 4. The pinion of the pair 44 is loose on its shaft 45 to which it is made solid in one direction of rotation by a ratchet wheel 46, engaged by a pawl solid with shaft 45. Another ratchet wheel 47 is also mounted loose on said shaft and opposes to the rotation in the other direction, by engaging a pawl solid with the frame of the engine.

By said arrangement, when the vehicle approaches the main terminals, the winding (of the cable) is operated by drum 4 revolved by the shaft driving cup 33: in these conditions the satellite gears revolve on their stub-shaft, their box being prevented from revolving because the helicoidal gear 41—42 is non-reversible and at all events is blocked by the ratchet wheel 47. When on the contrary, the vehicle moves away from the line terminals, compelling the drum to revolve in the reverse direction to unwind the cable, it drags pinion 44 and consequently the drive 45—43—42—41, and the box carrying the satellite gears is put in more or less rapid rotation which slows right down to stoppage, the motion of shaft 36.

Of course the most convenient reduction ratio can be adopted for the achievement of each arrangement, by properly selecting the speed ratios between the different wheels of the system.

It is otherwise evident that all parts and all members which can be used in vehicles concerned in the present invention may vary in shape, structure and construction without exceeding the limits of said invention.

What I claim is:

1. Means for applying electrical energy to a vehicle from a source exterior of the vehicle, comprising a cable leading from the exterior source to the vehicle, a support on the vehicle for the cable, said support being adapted to turn in accordance with the movements of the vehicle, means for propelling the vehicle, means for winding and unwinding the cable in accordance with the movements of the vehicle, the said means normally tending to wind the cable at a rate faster than the rate at which the vehicle approaches the source of energy, and friction means for reducing the winding rate to the rate of speed of the vehicle, the means for winding and unwinding the cable and the propelling means being energized from the cable.

2. An apparatus as set forth in claim 1, wherein the means for winding and unwinding the cable includes a differential gearing actuated by the propelling means.

CAMILLO SACERDOTI.